(12) United States Patent
Korra et al.

(10) Patent No.: US 10,726,425 B2
(45) Date of Patent: Jul. 28, 2020

(54) CUSTOM COMMUNICATION GENERATOR

(71) Applicant: Comenity LLC, Columbus, OH (US)

(72) Inventors: Ramesh Korra, Hilliard, OH (US); Randy West, Pickerington, OH (US); James Walz, Blacklick, OH (US)

(73) Assignee: Comenity LLC, Columbus, OH (US)

( * ) Notice: Subject to any disclaimer, the term of this patent is extended or adjusted under 35 U.S.C. 154(b) by 625 days.

(21) Appl. No.: 14/644,054

(22) Filed: Mar. 10, 2015

(65) Prior Publication Data

US 2016/0180349 A1    Jun. 23, 2016

Related U.S. Application Data

(60) Provisional application No. 62/093,915, filed on Dec. 18, 2014.

(51) Int. Cl.

| | |
|---|---|
| *G06Q 30/00* | (2012.01) |
| *H04W 12/06* | (2009.01) |
| *H04L 29/06* | (2006.01) |
| *H04W 4/80* | (2018.01) |
| *H04W 12/00* | (2009.01) |

(52) U.S. Cl.
CPC ....... *G06Q 30/018* (2013.01); *H04L 63/0853* (2013.01); *H04W 4/80* (2018.02); *H04W 12/06* (2013.01); *H04W 12/00407* (2019.01)

(58) Field of Classification Search
CPC .. G06Q 30/018; H04L 63/0853; H04W 12/06
USPC .......................................... 705/18
See application file for complete search history.

(56) References Cited

U.S. PATENT DOCUMENTS

| | | | | |
|---|---|---|---|---|
| 7,113,088 B2* | 9/2006 | Frick | ................. | G06Q 20/4014 340/539.11 |
| 7,606,918 B2* | 10/2009 | Holzman | ................ | H04L 63/08 709/206 |
| 7,694,146 B2* | 4/2010 | Friend | .................... | G06F 21/42 713/182 |
| 2006/0169764 A1* | 8/2006 | Ross | ....................... | G07F 19/20 235/375 |
| 2011/0040655 A1* | 2/2011 | Hendrickson | .......... | G06Q 30/02 705/27.1 |
| 2014/0324638 A1* | 10/2014 | Khalid | ............... | G06Q 30/0631 705/27.1 |

* cited by examiner

*Primary Examiner* — Florian M Zeender
*Assistant Examiner* — Joseph M Mutschler

(57) ABSTRACT

A system for generating a customized communication with a customer is described, and includes: a near field communication (NFC) reader for receiving, from the customer, a request for an interaction; an input device for receiving an input from the customer, wherein the input includes a customer credential; a processor for: receiving a request, from a near field communication (NFC) enabled device, for an interaction with a customer; requesting a valid customer credential from the customer; receiving an input from the customer in response to a request for the valid customer credential to achieve a received customer credential; determining a validity of the received customer credential; and generating, after the determining the validity of the received customer credential, client information customized for the customer based upon a customer account linked to a determined valid customer credential to achieve a generated customized client information.

15 Claims, 4 Drawing Sheets

300

```
┌─────────────────────────────────────────────────────────────────────────┐
│ RECEIVES A REQUEST, FROM A NEAR FIELD COMMUNICATION (NFC) DEVICE, FOR AN│
│                      INTERACTION WITH A CUSTOMER                        │
│                                   305                                   │
└─────────────────────────────────────────────────────────────────────────┘
                                    ↓
┌─────────────────────────────────────────────────────────────────────────┐
│              REQUESTS A VALID CUSTOMER CREDENTIAL FROM THE CUSTOMER     │
│                                   310                                   │
└─────────────────────────────────────────────────────────────────────────┘
                                    ↓
┌─────────────────────────────────────────────────────────────────────────┐
│  RECEIVES AN INPUT FROM THE CUSTOMER IN RESPONSE TO A REQUEST FOR THE   │
│  VALID CUSTOMER CREDENTIAL TO ACHIEVE A RECEIVED CUSTOMER CREDENTIAL    │
│                                   315                                   │
└─────────────────────────────────────────────────────────────────────────┘
                                    ↓
┌─────────────────────────────────────────────────────────────────────────┐
│           DETERMINES A VALIDITY OF THE RECEIVED CUSTOMER CREDENTIAL     │
│                                   320                                   │
└─────────────────────────────────────────────────────────────────────────┘
                                    ↓
┌─────────────────────────────────────────────────────────────────────────┐
│ GENERATES, AFTER THE DETERMINING OF THE VALIDITY OF THE RECEIVED CUSTOMER│
│ CREDENTIAL, CLIENT INFORMATION CUSTOMIZED FOR THE CUSTOMER BASED UPON A │
│  CUSTOMER ACCOUNT LINKED TO A DETERMINED VALID CUSTOMER CREDENTIAL TO   │
│         ACHIEVE A GENERATED CUSTOMIZED CLIENT INFORMATION               │
│                                   325                                   │
└─────────────────────────────────────────────────────────────────────────┘
                                    ↓
┌─────────────────────────────────────────────────────────────────────────┐
│  CAUSES THE GENERATED CUSTOMIZED CLIENT INFORMATION TO BE DISPLAYED AT A│
│                             DISPLAY SCREEN                              │
│                                   330                                   │
└─────────────────────────────────────────────────────────────────────────┘
                                    ↓
┌─────────────────────────────────────────────────────────────────────────┐
│   GENERATES A CONFIRMATION FOR THE RECEIPT OF THE VALID CUSTOMER        │
│   CREDENTIAL, AND TRANSMITS, VIA EMAIL, THE CONFIRMATION TO THE CUSTOMER│
│                                   335                                   │
└─────────────────────────────────────────────────────────────────────────┘
```

FIG. 3

CUSTOM COMMUNICATION GENERATOR

CROSS-REFERENCE TO RELATED APPLICATIONS

This application claims priority to and benefit of U.S. Patent Application No. 62/093,915, filed on Dec. 18, 2014 entitled "CUSTOM COMMUNICATION GENERATOR" by Ramesh Korra et al., and assigned to the assignee of the present application.

BACKGROUND

Near field communication (NFC) is a set of standards for smartphones and similar devices to establish radio communication with each other by touching them together or bringing them into proximity, by typically a distance of 3.9 inches or less. NFC uses electromagnetic induction between two loop antennas located within each other's near field, effectively forming an air-core transformer. In general, it operates within the globally available and unlicensed radio frequency ISM band of 13.56 MHz on ISO/IEC 18000-3 air interface and at rates ranging from 106 kbit/s to 424 kbit/s.

NFC involves an initiator and a target. The initiator actively generates an RF field that can power a passive target, an unpowered chip called a "tag". This enables NFC targets to take very simple form factors such as tags, stickers, key fobs, or cards that do not require batteries. NFC peer-to-peer communication is possible, provided both devices are powered. NFC tags contain data and are typically read only, but may be rewritable. The tags can securely store personal data such as debit and credit card information, loyalty program data, PINSs and networking contacts, among other information. Currently, the use of NFC-enabled devices focuses on enabling contactless financial transactions.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 3 depicts a flow diagram for a method for generating a customized communication with a customer, in accordance with an embodiment.

SUMMARY

The following is a summary of at least one embodiment of the present technology:

An article of manufacture, which includes a computer readable medium having stored therein a computer program for generating a customized communication with a customer, the computer program including: a first code segment which, when executed on a computer, receives a request, from a near field communication (NFC) enabled device, for an interaction with a customer; a second code segment which, when executed on the computer, requests a valid customer credential from the customer; a third code segment which, when executed on the computer, receives an input from the customer in response to a request for the valid customer credential to achieve a received customer credential; a fourth code segment which, when executed on the computer, determines a validity of the received customer credential; and a fifth code segment which, when executed on the computer, generates, after the determining the validity of the received customer credential, client information customized for the customer based upon a customer account linked to a determined valid customer credential to achieve a generated customized client information.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Notation and Nomenclature

Figure 1:
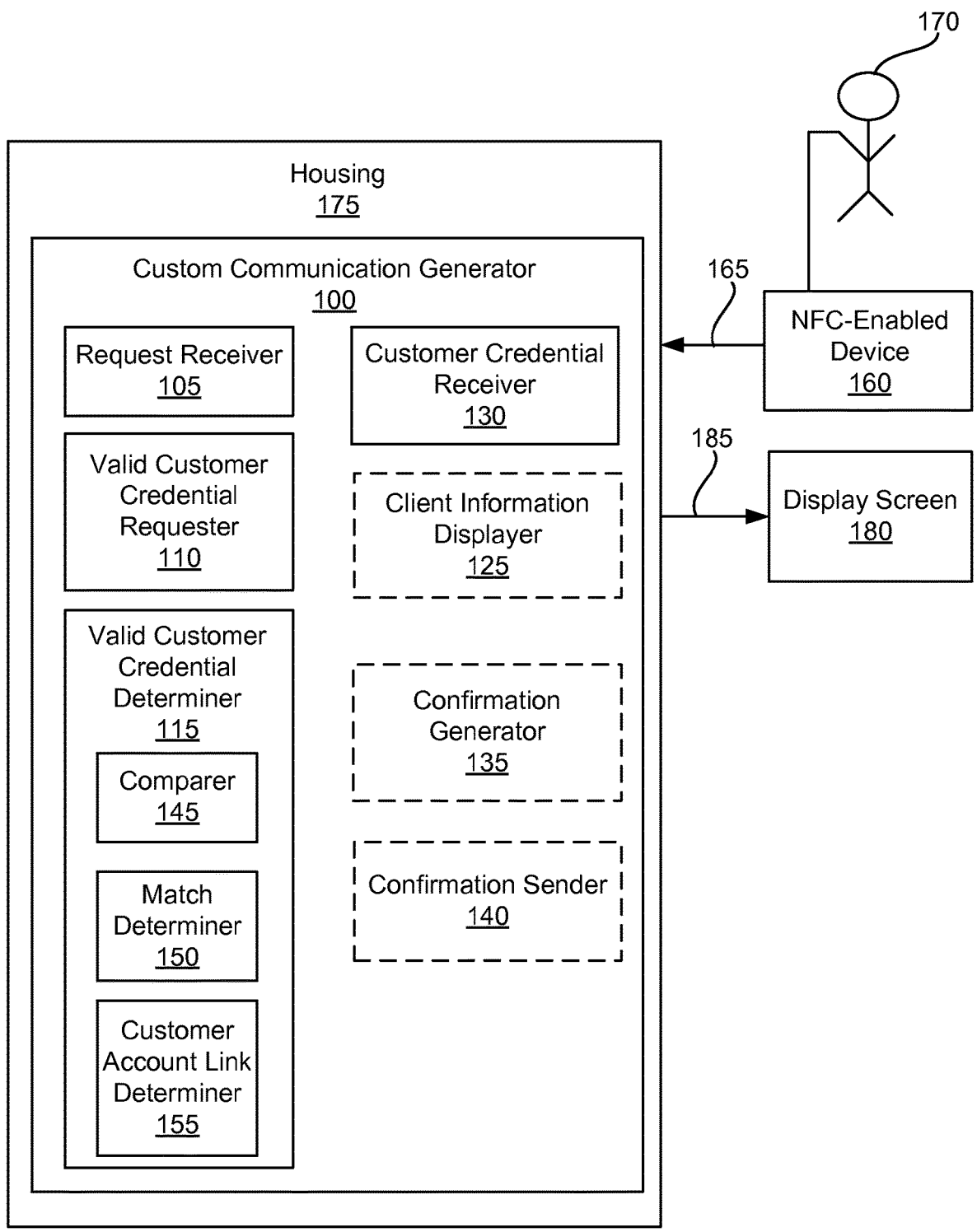
FIG. 1 is a block diagram that illustrates an embodiment of a custom communication generator, in accordance with an embodiment.
Figure 2:
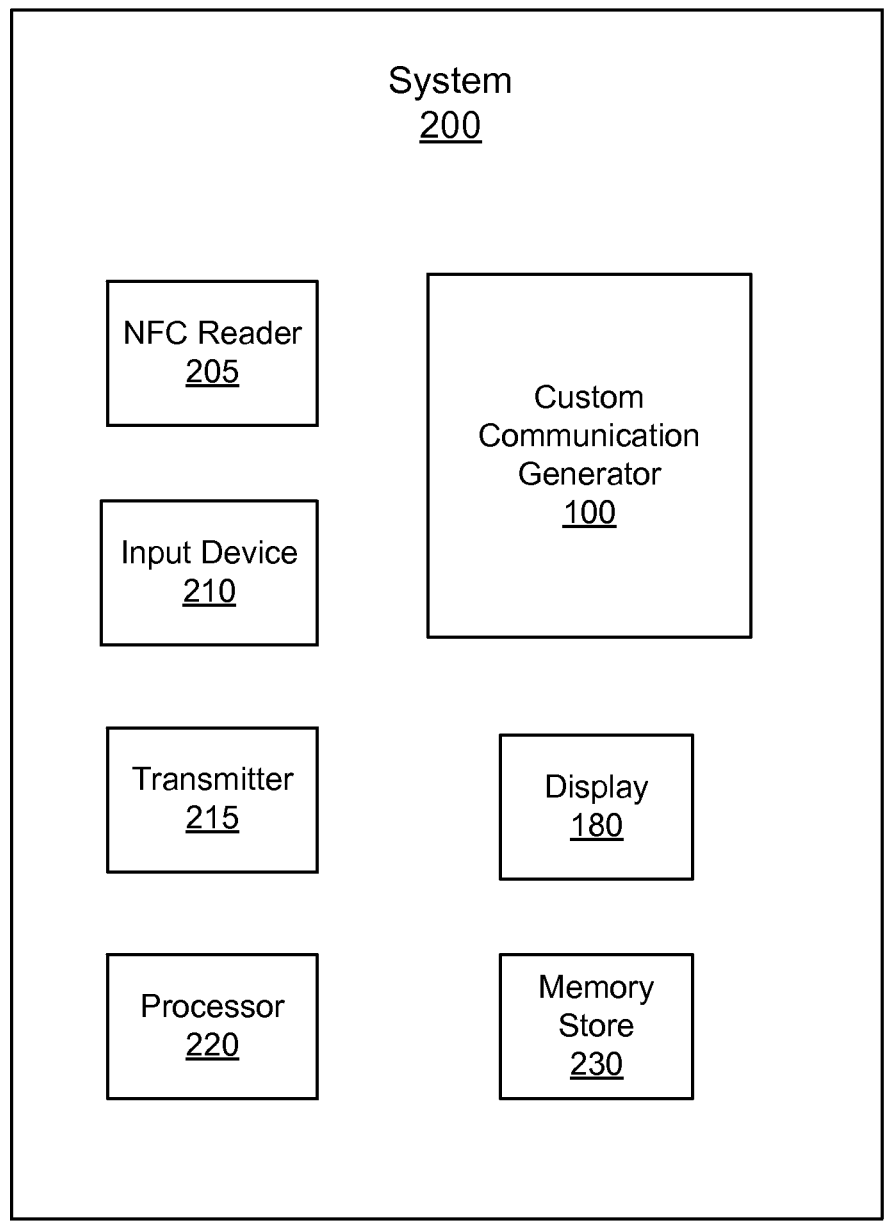
FIG. 2 is a block diagram that illustrates an embodiment of a system including a custom communication generator, in accordance with an embodiment.

Unless specifically stated otherwise as apparent from the following discussions, it is appreciated that throughout the present Description of Embodiments, discussions utilizing terms such as "receiving," "requesting", "determining", "generating", "causing", "comparing", "transmitting", or the like, often refer to the actions and processes of an electronic computing device (or portion thereof), module or system, such as, but not limited to, a custom communication generator (See FIGS. 1 and 2). The electronic computing device/module/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Embodiments and Discussion

Near field communication (NFC) is a set of standards for smartphones and similar devices to establish radio communication with each other by touching them together or bringing them into proximity, by typically a distance of 3.9 inches or less. NFC uses electromagnetic induction between two loop antennas located within each other's near field, effectively forming an air-core transformer. In general, it operates within the globally available and unlicensed radio frequency ISM band of 13.56 MHz on ISO/IEC 18000-3 air interface and at rates ranging from 106 kbit/s to 424 kbit/s.

NFC involves an initiator and a target. The initiator actively generates an RF field that can power a passive target, an unpowered chip called a "tag". This enables NFC targets to take very simple form factors such as tags, stickers, key fobs, or cards that do not require batteries. NFC peer-to-peer communication is possible, provided both devices are powered. NFC tags contain data and are typically read only, but may be rewritable. The tags can securely store personal data such as debit and credit card information, loyalty program data, PINSs and networking contacts, among other information. Currently, the use of NFC-enabled devices focuses on enabling contactless financial transactions.

Embodiments of the present technology enable a customer to "check-in" to a venue (e.g., retailer, department store, hotel lobby, mall, etc.) by tapping his NFC-enabled card or device at a kiosk. To validate his credentials, in one embodiment, the customer inputs a personal code at an input device of the kiosk. Once checked-in with a validated account, the customer can then view his account balance and personalized offers based on the customer's detected purchasing history and noted preferences. Embodiments further enable the customer to print and/or sign up for offers as well as receive email confirmations. Thus, in communication with an NFC-enabled card or device, embodiments of the present technology may present, but is not limited to presenting, the following types of information relating to the venue: account and reward point balance information; account status; personalized offers; selectable options for presenting more information; and confirmations. Overall, embodiments enhance a customer's experience and loyalty through in-store interaction using NFC and kiosk technologies.

The following is a high-level non-limiting example of embodiments. A customer walks into a store and sees a kiosk that provides information on venue sales, events and current specials. The customer taps his NFC-enabled card or mobile device on the NFC reader. The display screen at the kiosk instantly displays a map of the store and various custom offers for different sections of the store. The display screen presents many selectable options from which the customer may choose. For example, some of the services and information available to the customer via the kiosk are the following: account/rewards point balance information; account message notifying the customer of his account status; and various personalized offers in various departments such as presale events, wardrobe workshops, special pricing, double points on kids' apparel, and 15% off offers for accessories. The customer may learn more about each personalized offer by "clicking" on the offer. The customer may also sign up for the venue events and receive email confirmations. The customer may also print the personalized offer and use it for shopping.

In another high-level non-limiting example of embodiments, a customer walks into a hotel lobby and sees a kiosk. The kiosk provides information on events and specials. The customer taps their NFC-enabled card or mobile device on the NFC-reader. The display at the kiosk instantly displays a map of the hotel and various offers in different sections of the hotel. Further, available for the customer to view are the following general types of services, but not limited to such: account/point balances; various personalized offers for various departments of the venue such as ticket upgrades, free drinks, discounts for restaurants, double points on a purchase, dinner for two using 10,000 points, 10% off a spa, and advance reservations for a show. The customer may learn more about each personalized offer by "clicking" on the offer. The customer may also sign up for an event and then will receive an email confirmation of the reservation. The customer may also print the offer to be used for a later purchase. Additionally, the customer may choose to use his rewards' balance, card or other payment method to redeem the offer.

Of note, the customer may also experience the above described scenarios via his mobile device instead of the display screen coupled with the kiosk. Further, in lieu of an NFC reader, a barcode scanner or a magnetic swipe may also be utilized to identify and offer similar experiences to the retail customer.

The following discussion will begin with a description of a custom communication generator, with reference to FIGS. 1 and 2. The discussion will follow with a description of a method of operation for generating a customized communication with a customer, with reference to FIGS. 1-3. The discussion concludes with a description of an example computer system with which or upon which various embodiments of the present technology may be implemented.

Embodiments of a Customized Communication Generator

FIGS. 1 and 2 depict block diagrams that illustrates an embodiment of a custom communication generator 100 and a system 200 that includes the custom communication generator 100. The custom communication generator 100 includes the following modules coupled with a computer: a request receiver 105; a customer credential requester 110; a valid customer credential determiner 115; a client information generator 120; a client information displayer 125; a customer credential receiver 130. In various optional embodiments, the custom communication generator 100 further includes any of the following: a confirmation generator 135; and a confirmation sender 140. The valid customer credential determiner 115 optionally includes the following: a comparer 145; a match determiner 150; and a customer account link determiner 155.

Of note, in one embodiment, the custom communication generator 100 is enclosed within a housing 175. In another embodiment, the custom communication generator 100 is coupled with a housing 175, via wire and/or wirelessly.

FIG. 2 shows the system 200 including: the custom communication generator 100; an NFC reader 205; an input device 210; a transmitter 215; a processor 220; a display screen 180; and a memory store 230.

FIG. 1 further depicts the custom communication generator 100 coupled with, via wire and/or wirelessly, the NFC-enabled device 160 and the display screen 180. The NFC-enabled device 160 may be, but is not limited to being the following: a loyalty card, a private label credit card; a mobile application; and a mobile and private label credit card application. The display screen 180 may be part of a kiosk, a stand-alone display, or a display that is part of the customer's own mobile device. The areas at which embodiments may be positioned and/or practiced are any, but not limited to being, of the following locations: a retailer; a department store; a hotel lobby; and a mall.

The request receiver 105 is configured for receiving, from an NFC-Enabled Device 160, a request for an interaction with a customer 170. The "interaction" requested by the customer 170 includes communication regarding the account of the customer 170 with the particular venue at which the housing 175 of the custom communication generator 100 resides. For example, if the housing 175 is positioned at a retail store, the customer 170 who requests an interaction with the custom communication generator 100 is requesting account information regarding the customer's account at the retail store.

For example, a customer walks into the store, "Fish Fry" with a mobile phone that is NFC enabled (NFC enabled device 160) and walks over to a Fish Fry kiosk positioned at the front of the store. Fish Fry is a large supermarket devoted to anything and everything fish. The Fish Fry kiosk is capable of providing customers, who are already "registered" with the Fish Fry store the following: information regarding their customer account and loyalty points; promotional offerings that are tailored to the customer and that are based upon the customer's purchasing history; the ability of the customer to sign-up for services and other promotional offerings; etc. The Fish Fry kiosk also offers a customer who is not already registered with the Fish Fry store the ability to become registered.

Once at the Fish Fry kiosk, the customer taps his NFC enabled device 160 against the Fish Fry kiosk. The NFC reader 205, of the system 200 that is coupled with the Fish Fry kiosk, reads the information off of the NFC enabled mobile device 160. In one embodiment, the information that is at the NFC enabled mobile device 160 contains the customer's name, the customer's address and the customer's password as is already registered with Fish Fry. The NFC reader 205 pushes this information that was read off of the NFC enabled mobile device 160 (customer's name, customer's address, customer's password) to the custom communication generator 100. In another embodiment, the custom communication generator 100 pulls the information from the NFC reader 205.

In one embodiment, the process of tapping the NFC enabled mobile device 160 against the Fish Fry kiosk, causes a message to be sent to the custom communication generator 100. This message is a request 165 for an interaction between the Fish Fry kiosk and a customer 170 using the NFC mobile device 160. The request receiver 105 receives the request 165. The interaction is an exchange of information particular to the customer 170, such as, but not limited to, account information relating to the particular venue at which the request 165 occurs (e.g., Fish Fry store).

The valid customer credential requester 110 requests a valid customer credential from the customer 170. The valid customer credential is information which provides verification that the customer 170 is authorized to receive the information particular to the customer 170.

The customer credential receiver 130 receives an input in response to the requesting of the valid customer credential to achieve the received customer credential. The input, for example, is a password typed on a keyboard connected to the kiosk. In another embodiment, the input is information read by the NFC reader 205, such as, for example, the name, address and password of the customer 170.

The valid customer credential determiner 115 determines a validity of the received customer credential. In one example, the valid customer credential determiner 115 optionally includes: the comparer 145; the match determiner 150; and the customer account link determiner 155. The comparer compares the received customer credential to a set of customer credentials at a memory store, such as memory store 230. The set of customer credentials is one or more groups of information that relate to customers, wherein each group of the one or more groups of information is specific to a particular customer. This information that relates to particular customers is stored at the memory store 230, either in response to a customer registering the information with the retailer/business owner of the system 200, via a transfer of the information from a third party to the system 200, or from some other source.

The match determiner 150 determines a match between the received customer credential and the set of customer credentials to achieve a valid customer credential. For example, if the received customer credential is the customer's password, "Bailey" and the customer's address, "226 Kennedy Street", then the match determiner 150 determines if the password and the customer's address are the same as any portion of a group of customer credentials of the set of customer credentials. If a match is found, that is, if a group of customer credentials is found that includes the password, "Bailey", and the customer's address, "226 Kennedy Street", then the match determiner 150 identifies this group of customer credentials of the set of customer credentials as matching the received customer credential. After the group of customer credentials is identified to match the received customer credential, the received customer credential is considered to be a valid customer credential.

Each group of customer credentials of the set of customer credentials is linked to a particular customer. Thus, the customer account link determiner 155 determines which customer account is linked to the valid customer credential.

The client information generator 120, after the validity of the received customer credential is determined, generates client information 185 customized for the customer 170 based upon the customer account that is linked to a determined valid customer credential to achieve a generated customized client information. The client information 185 that is customized for the customer 170 is any type of information that is determined to be tailored to meet the needs/desires or potential needs/desires of the customer. For example, the client information 185 that is customized for the customer 170 may be, but is not limited to being, rewards point balance information, account status information, an offer, an event sign-up capability, a sign-up receipt, a transmission of a sign-up receipt, and a printable version of an offer.

The confirmation generator 135 generates a confirmation of a receipt of the valid customer credential. The confirmation sender 140 sends the confirmation to a transmitter 215. The transmitter 215, in one embodiment, then transmits this confirmation to the customer 170.

FIG. 2 shows a system 200 for generating a customized communication with a customer. The system 200 includes: the NFC reader 205; an input device 210; a processor 220; and a display screen 180. The input device 210 receives an input from the customer 170, wherein the input includes a customer credential. The processor 220 performs at least the following five functions: (1) receives a request, from the NFC enabled device, for an interaction with the customer 170; (2) requests a valid customer credential of the customer 170; (3) receives an input in response to requesting the valid customer credential; (4) determines a validity of the received customer credential; and (5) generates, after the determining of the validity of the received customer credential, client information that is customized for the customer 170 based upon a customer account linked to a determined valid customer credential. In one embodiment, the processor 230 further causes the generated client information to be displayed at the display screen. In yet another embodiment, the processor 220 also generates a confirmation for the receipt of the valid customer credential and sends the confirmation to the transmitter 215 for transmitting the confirmation to the customer 170. In one embodiment, the display screen 180, displays the generated client information. The display screen 180, may be coupled with the housing 175 described herein, or may be positioned at the customer's device (i.e., mobile device, such as a cell phone, tablet, etc.)

Example Methods of Operation

The following discussion sets forth in detail some example methods of operation of embodiments. With reference to FIGS. 1-3, flow diagrams of method 300 illustrates an example procedure used by various embodiments. Method 300 includes some procedures that, in various embodiments, are carried out by a processor under the control of computer-readable and computer-executable instructions. In various embodiments, these computer-readable and computer-executable instructions are described as "code segments", and presented separately (e.g., first codes segment, second code segment, etc.) to describe such instructions. In this fashion, procedures described herein and in conjunction with these flow diagrams, alone or in combination, are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, solid-state disks, any or all of which may be employed within a virtualization infrastructure. The computer-readable and computer-executable instructions, which reside on tangible computer readable storage media, are used to control or operate in conjunction with, for example, one or some combination of processors of a virtual machine. It is appreciated that the processor(s) may be physical or virtual or some combination (it should also be appreciated that a virtual processor is implemented on physical hardware). Although specific procedures are disclosed in method 300, such procedures are examples. That is, embodiments are well suited to performing various other procedures or variations of the procedures recited in method 300, alone or in combination. Likewise, in some embodiments, the procedures in method 300, alone or in combination, may be performed in an order different than presented and/or not all of the procedures described in one or more of these flow diagrams may be performed. It is further appreciated that procedures described in method 300, alone or in combination, may be implemented in hardware, or a combination of hardware with firmware and/or software.

FIG. 3 is a flow diagram of a method 300 for generating a customized communication with a customer, in accordance with an embodiment. Although specific procedures are disclosed in method 300, embodiments are well suited to performing various other procedures or variations of the procedures recited in method 300. It is appreciated that the procedures in method 300 may be performed in an order different than presented, that not all of the procedures in method 300 may be performed, and that additional procedures to those illustrated and described may be performed. All of, or a portion of, the procedures described by method 300 can be implemented by a processor or computer system executing instructions which reside, for example, on computer-usable/readable media. The following discussion of method 300 references FIGS. 1-4 unless specifically noted otherwise.

At step 305 of method 300, in one embodiment and as described herein, a request 165 is received from an NFC enabled device 160 for an interaction with a customer 170.

At step 310 of method 300, in one embodiment and as described herein, a valid customer credential is requested of the customer 170.

At step 315 of method 300, in one embodiment and as described herein, an input from the customer 170 is received in response to a request for the valid customer credential (of step 310) to achieve a received customer credential.

At step 320 of method 300, in one embodiment and as described herein, a validity of the received customer credential is determined. In one embodiment, the step 320 includes: comparing the received customer credential to a set of customer credentials at a memory store 230; determining a match between the received customer credential and the set of customer credentials to achieve a valid customer credential; and determining a customer account linked to the valid customer credential.

At step 325 of method 300, in one embodiment and as described herein, after the determining of the validity of the received customer credential is performed at step 320, client information customized for the customer 170 is generated. The customized client information 185 is generated based upon a customer account that is linked to a determined valid customer credential, to achieve a generated customized client information.

At step 330 of method 300, in one embodiment and as described herein, the generated customized client information is displayed at the display screen 180.

At step 335 of method 300, in one embodiment and as described herein, a confirmation of the receipt of the valid customer credential is generated. The confirmation is transmitted, via email, to the customer 170. In another embodiment, the confirmation is transmitted, via text, to the customer 170. In yet another embodiment, the confirmation is transmitted, via voicemail message, to the customer 170.

Example Computer System

Figure 4:
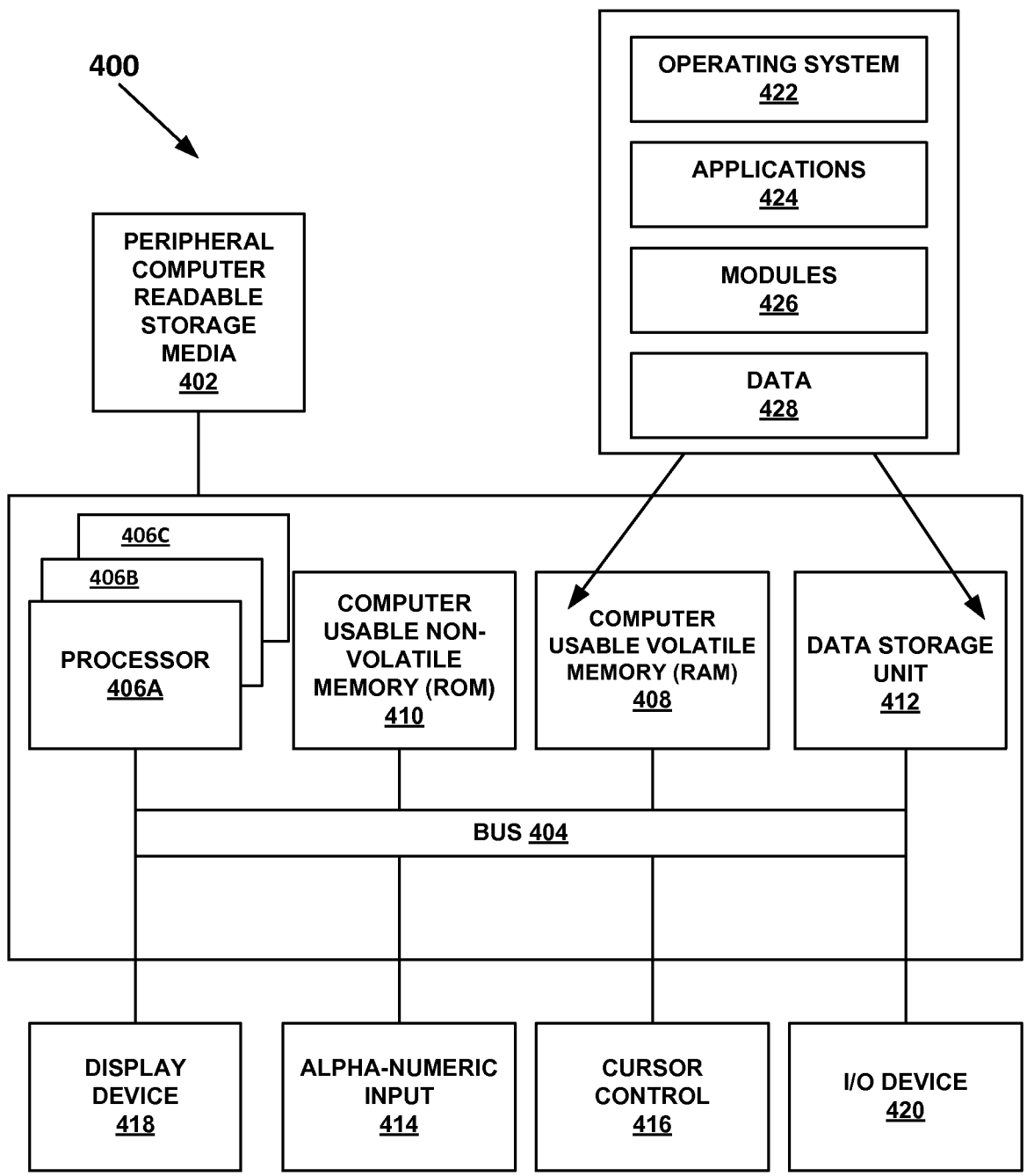
FIG. 4 is a block diagram of an example computer system with which or upon which various embodiments of the present invention may be implemented.

With reference now to FIG. 4, all or portions of some embodiments described herein are composed of computer-readable and computer-executable instructions that reside, for example, in computer-usable/computer-readable storage media of a computer system. That is, FIG. 4 illustrates one example of a type of computer (computer system 400) that can be used in accordance with or to implement various embodiments which are discussed herein. It is appreciated that computer system 400 of FIG. 4 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, distributed computer systems, media centers, handheld computer systems, multi-media devices, and the like. Computer system 400 of FIG. 4 is well adapted to having peripheral non-transitory computer-readable storage media 402 such as, for example, a floppy disk, a compact disc, digital versatile disc, other disc based storage, universal serial bus "thumb" drive, removable memory card, and the like coupled thereto.

System 400 of FIG. 4 includes an address/data bus 404 for communicating information, and a processor 406A coupled with bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors. System 400 also includes data storage features such as a computer usable volatile memory 408, e.g., random access memory (RAM), coupled with bus 404 for storing information and instructions for processors 406A, 406B, and 406C.

System 400 also includes computer usable non-volatile memory 410, e.g., read only memory (ROM), coupled with bus 404 for storing static information and instructions for processors 406A, 406B, and 406C. Also present in system 400 is a data storage unit 412 (e.g., a magnetic or optical disk and disk drive) coupled with bus 404 for storing information and instructions. System 400 also includes an optional alphanumeric input device 414 including alphanumeric and function keys coupled with bus 404 for communicating information and command selections to processor 406A or processors 406A, 406B, and 406C. System 400 also includes an optional cursor control device 416 coupled with bus 404 for communicating user input information and command selections to processor 406A or processors 406A, 406B, and 406C. In one embodiment, system 400 also includes an optional display device 418 coupled with bus 404 for displaying information.

Referring still to FIG. 4, optional display device 418 of FIG. 4 may be a liquid crystal device, cathode ray tube, plasma display device or other display device suitable for creating graphic images and alphanumeric characters recognizable to a user. Optional cursor control device 416 allows the computer user to dynamically signal the movement of a visible symbol (cursor) on a display screen of display device 418 and indicate user selections of selectable items displayed on display device 418. Many implementations of cursor control device 416 are known in the art including a trackball, mouse, touch pad, joystick or special keys on alphanumeric input device 414 capable of signaling movement of a given direction or manner of displacement. Alternatively, it will be appreciated that a cursor can be directed and/or activated via input from alphanumeric input device 414 using special keys and key sequence commands. System 400 is also well suited to having a cursor directed by other means such as, for example, voice commands. System 400 also includes an I/O device 420 for coupling system 400 with external entities. For example, in one embodiment, I/O device 420 is a modem for enabling wired or wireless communications between system 400 and an external network such as, but not limited to, the Internet.

Referring still to FIG. 4, various other components are depicted for system 400. Specifically, when present, an operating system 422, applications 424, modules 426, and data 428 are shown as typically residing in one or some combination of computer usable volatile memory 408 (e.g., RAM), computer usable non-volatile memory 410 (e.g., ROM), and data storage unit 412. In some embodiments, all or portions of various embodiments described herein are stored, for example, as an application 424 and/or module 426 in memory locations within RAM 408, computer-readable storage media within data storage unit 412, peripheral computer-readable storage media 402, and/or other tangible computer-readable storage media.

What we claim is:

1. A computing device comprising: one or more processors to:
    receive a request, via a near field communication (NFC) at a retail store, for an interaction with a mobile device of a customer, the request being a request for account information regarding an account of the customer at the retail store;
    instantly, upon receipt of the request, provide a map of the retail store to be displayed on a display screen of the mobile device of the customer;
    receive, from said mobile device of the customer, a request to register for a customer credential;
    provide, to said mobile device of the customer and in response to the request to register for said customer credential, a request for credential information consisting of: a name of the customer, and an address of the customer;
    receive, from said mobile device of the customer and in response to the request for credential information, a response to said request for credential information;
    utilize the response to said request for credential information to generate a valid customer credential;
    request the valid customer credential from said mobile device of the customer;
    receive an input from said mobile device of the customer in response to a request for said valid customer credential to achieve a received customer credential;
    determine a validity of said received customer credential, the validity of the received customer credentials determined after a customer physically inputs a personal code directly to a second computing device distinct from said customer's mobile device;
    generate, after said validity of said received customer credential is determined, client information customized for a customer based upon the account of the customer at the retail store linked to a determined valid customer credential to provide a generated customized client information to the customer, the customized client information comprising two or more offers from a group of client information consisting of: a doubling of earned points on a purchase, a presale event, a wardrobe workshop, a ticket upgrade, and a discount for a restaurant;
    generate a confirmation for said receipt of said valid customer credential;
    and transmit, via email, said confirmation to said mobile device of the customer.

2. The computing device of claim 1, where the one or more processors are further configured to:
    cause said generated customized client information to be displayed at the display screen of the customer's mobile device.

3. The computing device of claim 1, where the one or more processors are further configured to:
    compare said received customer credential to a set of customer credentials at a memory store;
    determine a match between said received customer credential and said set of customer credentials to achieve a valid customer credential; and
    determine a customer account linked to said valid customer credential.

4. The computing device of claim 1, where the one or more processors are further configured to:
    generate a rewards point balance information customized for said customer.

5. The computing device of claim 1, where the one or more processors are further configured to:
    generate an account status information customized for said customer.

6. The computing device of claim 1, where the one or more processors are further configured to:
    generate a customized offer for said customer.

7. The computing device of claim 1, where the one or more processors are further configured to:
    generate an event sign-up capability for said customer.

8. The computing device of claim 1, where the one or more processors are further configured to:

generate a sign-up receipt for said customer.

9. The computing device of claim 8, where the one or more processors are further configured to:
transmit said sign-up receipt to a registered communication enabled device of said customer.

10. The computing device of claim 1, where the one or more processors are further configured to:
configure a printable version of a customized offer.

11. A non-transitory computer-readable medium storing instructions, the instructions comprising:
one or more instructions that, when executed by one or more processors, cause the one or more processors to:
receive, via a near field communication (NFC) at a retail store, a request for an interaction with a mobile device of a customer, the request being a request for account information regarding the account of the customer at the retail store;
instantly, upon receipt of the request, provide a map of the retail store to be displayed on a display screen of the mobile device of the customer;
request a valid customer credential from said mobile device of the customer;
receive an input from said mobile device of the customer in response to said request for said valid customer credential to achieve a received customer credential;
determine a validity of said received customer credential, the validity of the received customer credentials determined after a customer physically inputs a personal code directly to a second computing device distinct from said mobile device of the customer;
generate, after said validity of said received customer credential is determined, client information customized for said customer based upon the account of the customer at the retail store linked to a determined valid customer credential to provide a generated customized client information to the customer, the customized client information comprising two or more offers from a group of client information consisting of: a doubling of earned points on a purchase, a presale event, a wardrobe workshop, a ticket upgrade, and a discount for a restaurant;
generate a confirmation for said receipt of said valid customer credential;
and transmit, via email, said confirmation to said mobile device of the customer.

12. The non-transitory computer-readable medium of claim 11, where the one or more instructions, when executed by the one or more processors, further cause the one or more processors to:
display said generated customized client information at the display screen.

13. The non-transitory computer-readable medium of claim 11, where the one or more instructions, when executed by the one or more processors, further cause the one or more processors to:
compare said received customer credential to a set of customer credentials at a memory store;
determine a match between said received customer credential and said set of customer credentials to achieve a valid customer credential; and
determine a customer account linked to said valid customer credential.

14. A system for generating a customized communication with a mobile device of a customer, said system comprising:
a near field communication (NFC) reader configured for receiving, from said mobile device of the customer, a request for an interaction with a retail computing system of a retail store, the request being a request for account information regarding the account of the customer at the retail store;
an input device configured for receiving an input from said mobile device of the customer, wherein said input comprises a customer credential;
a processor configured for:
receiving a request, via a near field communication (NFC), for said interaction with said mobile device of the customer;
displaying, on a display screen of the mobile device of the customer and instantly upon receipt of the request, a map of the retail store;
requesting a valid customer credential from said mobile device of the customer;
receiving an input from said mobile device of the customer in response to a request for said valid customer credential to achieve a received customer credential;
determining a validity of said received customer credential, the validity of the received customer credentials determined after a customer physically inputs a personal code directly to a second computing device distinct from said mobile device of the customer;
generating, after said determining said validity of said received customer credential, client information customized for said customer based upon the account of the customer at the retail store linked to a determined valid customer credential to provide a generated customized client information to the customer, the customized client information comprising two or more offers from a group of client information consisting of: a doubling of earned points on a purchase, a presale event, a wardrobe workshop, a ticket upgrade, and a discount for a restaurant;
generating a confirmation for a receipt of a customer credential that is determined to be valid; and sending said confirmation to a transmitter coupled with said processor, said transmitter configured for transmitting said confirmation to said mobile device of the customer.

15. The system of claim 14, wherein said processor is further configured for:
causing said customized client information to be displayed at the display of the customer's mobile device.

* * * * *